US012641213B2

(12) United States Patent
Mate et al.

(10) Patent No.: US 12,641,213 B2
(45) Date of Patent: May 26, 2026

(54) HEAD MOTION DEPENDENT VIEWPORT REGION MODIFICATION FOR OMNIDIRECTIONAL CONVERSATIONAL VDD

(71) Applicant: Nokia Technologies Oy, Espoo (FI)

(72) Inventors: Sujeet Shyamsundar Mate, Tampere (FI); Miska Matias Hannuksela, Tampere (FI); Yu You, Tampere (FI); Emre Baris Aksu, Tampere (FI); Igor Danilo Diego Curcio, Vimercate (IT); Saba Ahsan, Islamabad (PK)

(73) Assignee: Nokia Technologies Oy, Espoo (FI)

( * ) Notice: Subject to any disclaimer, the term of this patent is extended or adjusted under 35 U.S.C. 154(b) by 105 days.

(21) Appl. No.: 18/574,701

(22) PCT Filed: Jun. 15, 2022

(86) PCT No.: PCT/EP2022/066379
§ 371 (c)(1),
(2) Date: Dec. 27, 2023

(87) PCT Pub. No.: WO2023/274734
PCT Pub. Date: Jan. 5, 2023

(65) Prior Publication Data
US 2024/0297977 A1     Sep. 5, 2024

Related U.S. Application Data

(60) Provisional application No. 63/215,679, filed on Jun. 28, 2021.

(51) Int. Cl.
*H04N 13/00*     (2018.01)
*G06F 3/01*     (2006.01)
(Continued)

(52) U.S. Cl.
CPC ........... *H04N 13/351* (2018.05); *G06F 3/012* (2013.01); *G06T 7/20* (2013.01); *G06V 10/764* (2022.01)

(58) Field of Classification Search
None
See application file for complete search history.

(56) References Cited

U.S. PATENT DOCUMENTS

| | | | | |
|---|---|---|---|---|
| 2010/0150231 A1* | 6/2010 | Huang | ................... | H04N 19/61 |
| | | | | 375/E7.243 |
| 2011/0149030 A1* | 6/2011 | Kang | ................... | H04N 13/398 |
| | | | | 348/E13.001 |

(Continued)

FOREIGN PATENT DOCUMENTS

| | | |
|---|---|---|
| WO | 2019/243534 A1 | 12/2019 |
| WO | 2021/074005 A1 | 4/2021 |
| WO | 2022/013326 A1 | 1/2022 |

OTHER PUBLICATIONS

Owt-Server, Github, Retrieved on Apr. 17, 2024, Webpage available at : https://github.com/open-webrtc-toolkit/owt-server.

(Continued)

*Primary Examiner* — Martin Mushambo
(74) *Attorney, Agent, or Firm* — McCarter & English, LLP

(57) ABSTRACT

A method for packing a frame of immersive or omnidirectional content may include: determining one or more head motion statistics for rendering and packing immersive or omnidirectional content; determining a classification of a head motion based, at least partially, on the one or more determined head motion statistics; determining resolution(s) and/or a packing scheme based on determined viewport change rate, extent, change prediction/frequency, etc., as summarized by FIG. 6. If there is little or no head motion, the majority of a frame may be packed with high quality and (Continued)

600

```
determine one or more head
motion statistics for rendering     610
immersive content determine a classification of a
head motion based, at least
partially, on the one or more       620
determined head motion
statistics select at least one resolution for
at least part of the immersive
content based, at least partially,  630
on the determined classification determine a packing scheme
based, at least partially, on the
at least one selected resolution    640
and the determined
classification perform packing of the
immersive content in at least
one frame based, at least          650
partially, on the determined
packing scheme
``` resolution content of the viewport. If there is a greater amount of head motion, a smaller portion of the frame may be packed with high quality and resolution content of the viewport, and medium/low resolution content may be included with the frame that is associated with non-viewport content.

18 Claims, 7 Drawing Sheets

(51) Int. Cl.
  G06T 7/20       (2017.01)
  G06V 10/764     (2022.01)
  H04N 13/351     (2018.01)

(56)           References Cited

U.S. PATENT DOCUMENTS

| | | | | |
|---|---|---|---|---|
| 2013/0202051 | A1* | 8/2013 | Zhou | H04N 19/521 |
| | | | | 375/240.26 |
| 2014/0098886 | A1* | 4/2014 | Crenshaw | H04N 19/587 |
| | | | | 375/240.16 |
| 2016/0260196 | A1* | 9/2016 | Roimela | G02B 27/0172 |
| 2018/0262774 | A1* | 9/2018 | Lin | H04N 19/577 |
| 2019/0349598 | A1* | 11/2019 | Aminlou | H04N 19/105 |
| 2020/0051207 | A1 | 2/2020 | Ogasawara | |
| 2020/0077070 | A1* | 3/2020 | Takahashi | H04N 13/122 |
| 2020/0107003 | A1 | 4/2020 | Phillips et al. | |
| 2020/0322632 | A1* | 10/2020 | Hanhart | H04N 19/117 |
| 2021/0055787 | A1 | 2/2021 | Chhabra et al. | |
| 2021/0368190 | A1* | 11/2021 | Sjöberg | H04N 19/44 |
| 2022/0191444 | A1* | 6/2022 | Nakagoshi | H04N 23/687 |
| 2022/0239719 | A1* | 7/2022 | Gül | H04N 21/6587 |

OTHER PUBLICATIONS

"Support for ITT4RT", 3GPP TSG-SA4 Meeting #112e, S4-210201, Intel, Feb. 1-10, 2021, 35 pages.

Zare et al., "6K Effective Resolution with 4K HEVC Decoding Capability for OMAF-compliant 360° Video Streaming", PV '18: Proceedings of the 23rd Packet Video Workshop, Jun. 12, 2018, pp. 1-6.

Zare et al., "6K and 8K Effective Resolution with 4K HEVC Decoding Capability for 360 Video Streaming", ACM Transactions on Multimedia Computing, Communications, and Applications, vol. 15, No. 2, Jul. 27, 2019, 22 pages.

International Search Report and Written Opinion received for corresponding Patent Cooperation Treaty Application No. PCT/EP2022/066379, dated Oct. 10, 2022, 13 pages.

\* cited by examiner

580

Encoding resolution
7680x4608 = 20x18 (384x256)
6144x3072 = 16 x 12 (384x256)
3072x1536 = 8x6 (384x256)

560

Each tile 45x30 degrees
3072x1536 =8x6

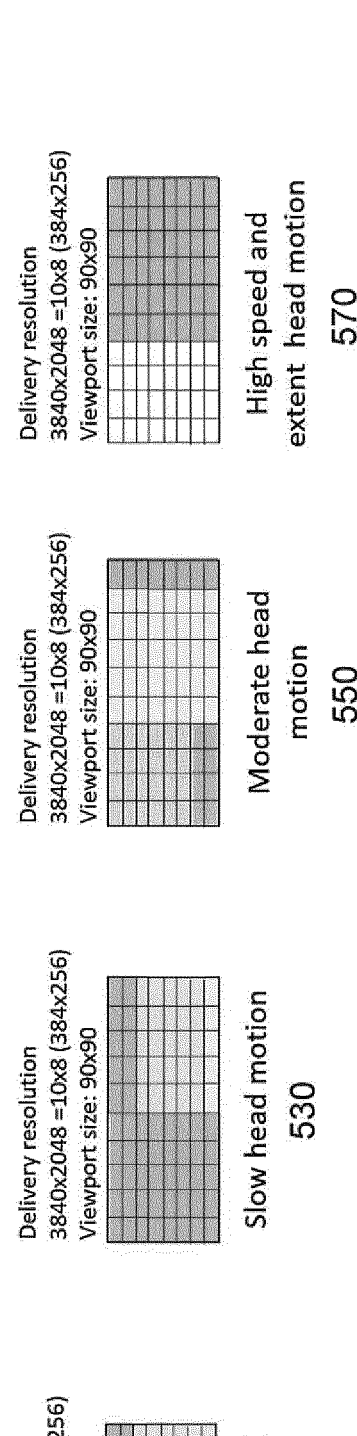

Delivery resolution
3840x2048 =10x8 (384x256)
Viewport size: 90x90

High speed and
extent head motion

570

540

Each tile 22.5x15 degrees
6144x3072 = 16x12

Delivery resolution
3840x2048 =10x8 (384x256)
Viewport size: 90x90

Moderate head
motion

550

510

Each tile 18x10 degrees
7680x4608 = 20x18

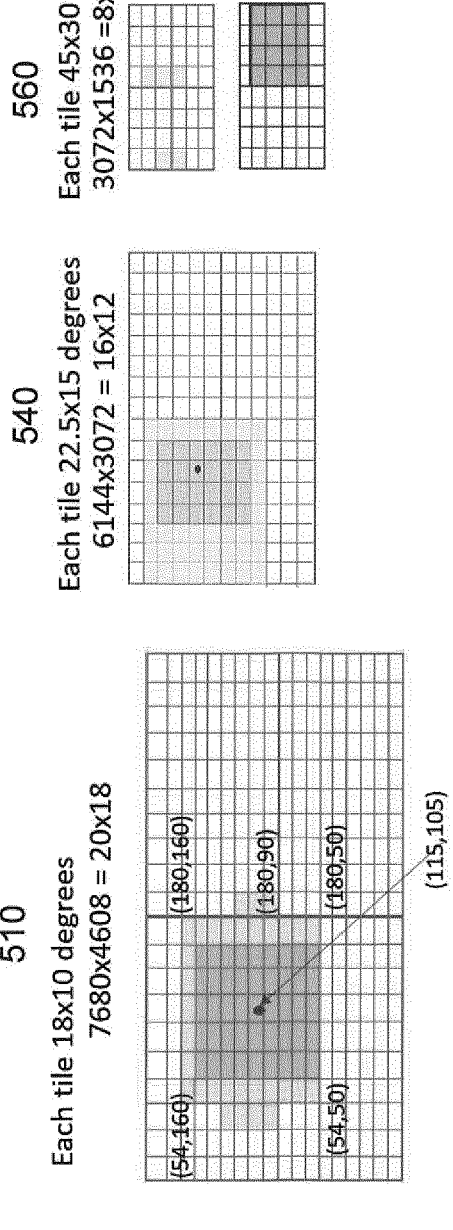

(180,160)

(180,90)

(180,50)

(115,105)

(54,160)

(54,50)

Delivery resolution
3840x2048 =10x8 (384x256)
Viewport size: 90x90

Slow head motion

530

Delivery resolution
3840x2048 =10x8 (384x256)
Viewport size: 90x90

Static or low head
motion

520

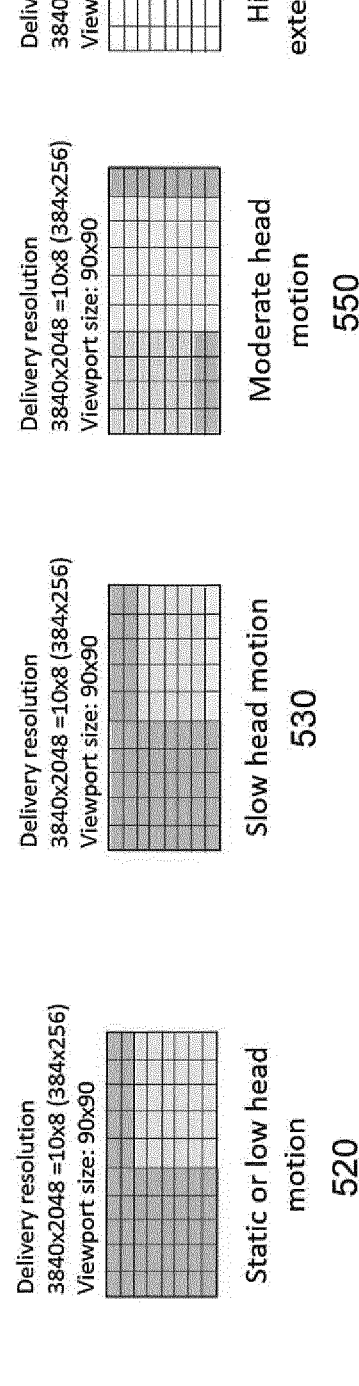

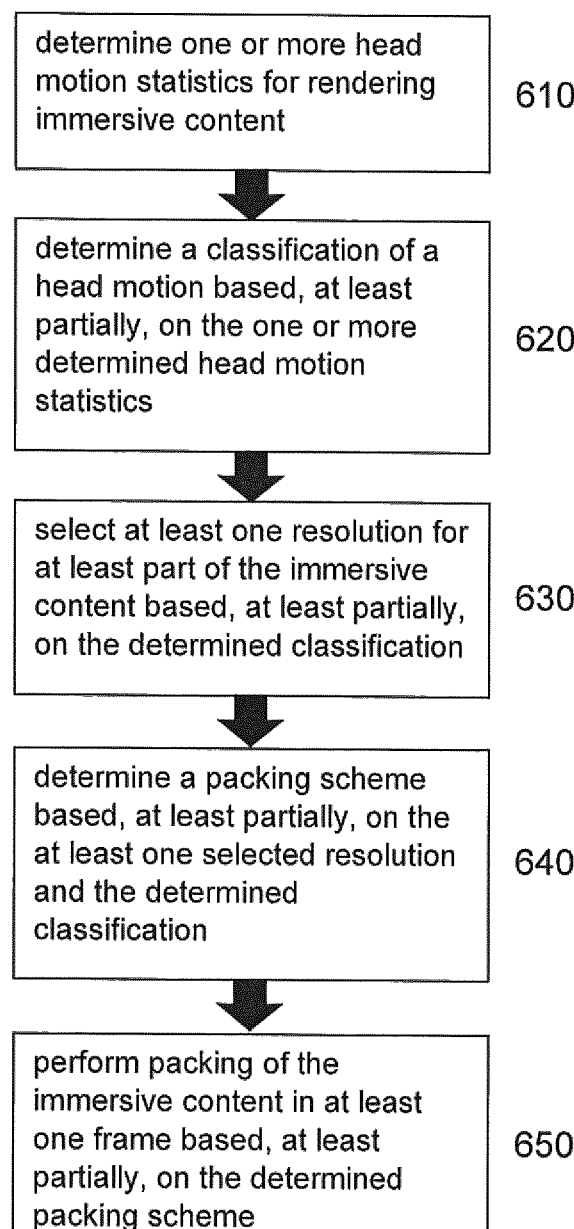

determine one or more head motion statistics for rendering immersive content 610 determine a classification of a head motion based, at least partially, on the one or more determined head motion statistics 620 select at least one resolution for at least part of the immersive content based, at least partially, on the determined classification 630 determine a packing scheme based, at least partially, on the at least one selected resolution and the determined classification 640 perform packing of the immersive content in at least one frame based, at least partially, on the determined packing scheme 650

FIG. 6

700 determine, at least, a current viewport for viewing immersive content       710 indicate the current viewport to a user equipment       720 receive, from the user equipment, a bitstream comprising at least one packed frame of the immersive content, wherein at least one of a packing scheme of the at least one packed frame, or a resolution of at least a portion of the at least one packed frame is based, at least partially, on the indicated current viewport       730

HEAD MOTION DEPENDENT VIEWPORT REGION MODIFICATION FOR OMNIDIRECTIONAL CONVERSATIONAL VDD

RELATED APPLICATION

This application was originally filed as PCT Application No. PCT/EP2022/066379, filed on Jun. 15, 2022, which claims priority from U.S. Provisional Application No. 63/215,679, filed on Jun. 28, 2021, each of which is incorporated herein by reference in its entirety.

BACKGROUND

Technical Field

The example and non-limiting embodiments relate generally to transmission of video content and, more particularly, to selection of bitrate and/or resolution of omnidirectional or immersive video included in a transmission during streaming/conversational scenarios.

Brief Description of Prior Developments

It is known, in immersive video encoding, to perform viewport dependent delivery of immersive video that involves tile merging.

SUMMARY

The following summary is merely intended to be exemplary. The summary is not intended to limit the scope of the claims.

In accordance with one aspect, an apparatus comprising: at least one processor; and at least one memory including computer program code: the at least one memory and the computer program code configured to, with the at least one processor, cause the apparatus at least to: determine one or more head motion statistics for rendering immersive content; determine a classification of a head motion based, at least partially, on the one or more determined head motion statistics; select at least one resolution for at least part of the immersive content based, at least partially, on the determined classification; determine a packing scheme based, at least partially, on the at least one selected resolution and the determined classification; and perform packing of the immersive content in at least one frame based, at least partially, on the determined packing scheme.

In accordance with one aspect, a method comprising: determining one or more head motion statistics for rendering immersive content: determining a classification of a head motion based, at least partially, on the one or more determined head motion statistics: selecting, with a user equipment, at least one resolution for at least part of the immersive content based, at least partially, on the determined classification; determining a packing scheme based, at least partially, on the at least one selected resolution and the determined classification; and performing packing of the immersive content in at least one frame based, at least partially, on the determined packing scheme.

In accordance with one aspect, an apparatus comprising means for performing: determining one or more head motion statistics for rendering immersive content: determining a classification of a head motion based, at least partially, on the one or more determined head motion statistics: selecting at least one resolution for at least part of the immersive content based, at least partially, on the determined classification: determining a packing scheme based, at least partially, on the at least one selected resolution and the determined classification; and performing packing of the immersive content in at least one frame based, at least partially, on the determined packing scheme.

In accordance with one aspect, a computer-readable medium comprising program instructions stored thereon which, when executed with at least one processor, cause the at least one processor to: determine one or more head motion statistics for rendering immersive content: determine a classification of a head motion based, at least partially, on the one or more determined head motion statistics: select at least one resolution for at least part of the immersive content based, at least partially, on the determined classification: determine a packing scheme based, at least partially, on the at least one selected resolution and the determined classification; and perform packing of the immersive content in at least one frame based, at least partially, on the determined packing scheme.

In accordance with one aspect, an apparatus comprising: at least one processor; and at least one memory including computer program code: the at least one memory and the computer program code configured to, with the at least one processor, cause the apparatus at least to: determine, at least, a current viewport for viewing immersive content: indicate the current viewport to a user equipment; and receive, from the user equipment, a bitstream comprising at least one packed frame of the immersive content, wherein at least one of a packing scheme of the at least one packed frame, or a resolution of at least a portion of the at least one packed frame is based, at least partially, on the indicated current viewport.

In accordance with one aspect, a method comprising: determining, at least, a current viewport for viewing immersive content: indicating the current viewport to a user equipment; and receiving, from the user equipment, a bitstream comprising at least one packed frame of the immersive content, wherein at least one of a packing scheme of the at least one packed frame, or a resolution of at least a portion of the at least one packed frame is based, at least partially, on the indicated current viewport.

In accordance with one aspect, an apparatus comprising means for performing: determining, at least, a current viewport for viewing immersive content: indicating the current viewport to a user equipment; and receiving, from the user equipment, a bitstream comprising at least one packed frame of the immersive content, wherein at least one of a packing scheme of the at least one packed frame, or a resolution of at least a portion of the at least one packed frame is based, at least partially, on the indicated current viewport.

In accordance with one aspect, a computer-readable medium comprising program instructions stored thereon which, when executed with at least one processor, cause the at least one processor to: determine, at least, a current viewport for viewing immersive content; indicate the current viewport to a user equipment; and receive, from the user equipment, a bitstream comprising at least one packed frame of the immersive content, wherein at least one of a packing scheme of the at least one packed frame, or a resolution of at least a portion of the at least one packed frame is based, at least partially, on the indicated current viewport.

BRIEF DESCRIPTION OF THE DRAWINGS

The foregoing aspects and other features are explained in the following description, taken in connection with the accompanying drawings, wherein:

FIG. 5 is a diagram illustrating features as described herein;

FIG. 6 is a flowchart illustrating steps as described herein; and

FIG. 7 is a flowchart illustrating steps as described herein.

DETAILED DESCRIPTION OF EMBODIMENTS

Figure 1:
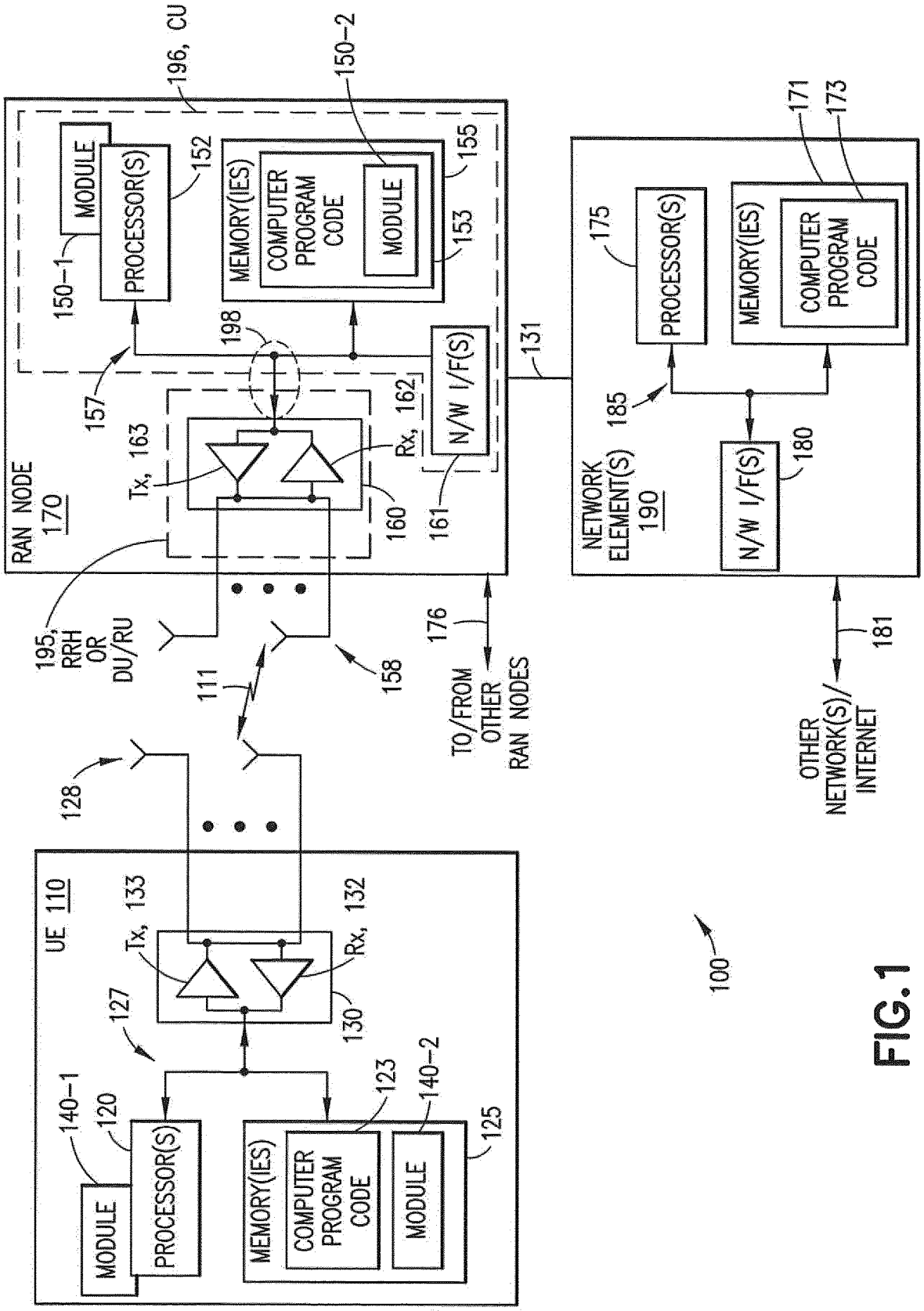
FIG. 1 is a block diagram of one possible and non-limiting exemplary system in which the exemplary embodiments may be practiced.

The following abbreviations that may be found in the specification and/or the drawing figures are defined as follows:

3GPP third generation partnership project
5G fifth generation
5GC 5G core network
AMF access and mobility management function
CU central unit
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
ERP equirectangular projection
E-UTRA evolved universal terrestrial radio access, i.e., the LTE radio access technology
FOV field of view
gNB (or gNodeB) base station for 5G/NR, i.e., a node providing NR user plane and control plane protocol terminations towards the UE, and connected via the NG interface to the 5GC
I/F interface
IoT Internet of Things
ITT4RT Immersive Teleconferencing and Telepresence for Remote Terminals
L1 layer 1
LTE long term evolution
MAC medium access control
MME mobility management entity
ng or NG new generation
ng-eNB or NG-eNB new generation eNB
NR new radio
N/W or NW network
OMAF omnidirectional media format
OOI object of interest
PDCP packet data convergence protocol
PHY physical layer
RAN radio access network
RF radio frequency
RLC radio link control
RRC radio resource control
RRH remote radio head
RS reference signal
RTCP real-time transport control protocol
RU radio unit
Rx receiver SDAP service data adaptation protocol
SGW serving gateway
SIP session initiation protocol
SMF session management function
Tx transmitter
UE user equipment (e.g., a wireless, typically mobile device)
UPF user plane function
VDD viewport-dependent delivery Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

While not illustrated in FIG. 1, the UE 110 may additionally include or be connected with means for capturing video content or rendering video content. Means for capturing video content may comprise, for example, a 360 camera or an omnidirectional camera. Means for rendering video content may comprise, for example, a display, screen, monitor, projecting device, or head mounted display (HMD). A device for rendering video content may be used with information indicating head motion of a user, which may be provided by a head-motion sensor that is part of or separate from the device.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an SI interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions.

The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Features as described herein generally relate to immersive content, including omnidirectional content. More specifically, example embodiments may relate to aspects of viewport dependent delivery of omnidirectional or 360-degree video. In the following description, the term "omnidirectional" may refer to media content that may have a greater spatial extent than a field-of-view of a device rendering the content. Omnidirectional content may, for example, cover substantially 360 degrees in the horizontal dimension and substantially 180 degrees in the vertical dimension, but omnidirectional may also refer to content covering less than a 360 degree view in the horizontal direction and/or a 180 degree view in the vertical direction, but covering a greater view than the field of view of a rendering device in either or both the horizontal and vertical directions.

An omnidirectional image may be represented by a sphere that has been mapped to a two-dimensional image plane using equirectangular projection (ERP). In this case, the horizontal coordinate may be considered equivalent to a longitude, and the vertical coordinate may be considered equivalent to a latitude, with no transformation or scaling applied. An ERP image may be formed from a set of input images, such as fisheye images of a camera array or a camera device with multiple lenses and sensors, which are stitched together into a spherical image. The spherical image may further be projected into a cylindrical image (i.e. an image shaped like a cylinder without the top and bottom faces). The cylinder may then be unfolded to form a two-dimensional projected frame. In practice, one or more of the presented steps may be merged: for example, the input images may be directly projected onto a cylinder without an intermediate projection onto a sphere. The projection structure for equirectangular projection may be considered to be a cylinder that comprises a single surface.

In general, omnidirectional content may be mapped onto different types of solid geometrical structures, such as polyhedron (i.e. a three-dimensional solid object containing flat polygonal faces, straight edges, and sharp corners or vertices, e.g., a cube or a pyramid), cylinder (by projecting a spherical image onto the cylinder, as described above with the equirectangular projection), cylinder (directly without projecting onto a sphere first), cone, etc. After mapping of the omnidirectional content onto a geometrical structure, the mapped image may then be unwrapped to a two-dimensional image plane. This process may enable presentation of omnidirectional content with a 2D rendering device.

A "viewport" may be defined as a region of an omnidirectional image or video suitable for display and viewing by the user. A current viewport (which may be simply referred to as a viewport) may be defined as the part of the spherical video that is currently displayed and hence is viewable by the user(s). At any point in time, a video rendered by an application on, for example, a head-mounted display (HMD) may comprise rendering a portion of the 360-degrees video, which is referred to as a viewport.

The term "viewport-dependent video" may refer to video content where the region(s) that lie within the viewport are treated differently than the rest of the omnidirectional content (e.g. by encoding the viewport at a higher quality). Such a content may be provided by the sender to a receiver device based on the viewport orientation and viewport size or field of view of the receiver device.

Features as described herein generally relate to viewport dependent delivery of omnidirectional content (or any immersive content). More specifically, features as described herein may relate to the delivery efficiency of viewport dependent delivery, in terms of bandwidth, quality, and computational processing. OMAF and Immersive Teleconferencing and Telepresence for Remote Terminals (ITT4RT) schemes have specified methods for viewport dependent delivery for streaming and conversational scenarios, respectively. One of the promising approaches for viewport dependent delivery involves tile merging. This approach has two main advantages: scalability to serve multiple clients with different viewports; and single decoder operation by the receiver clients.

In the (industrial) Internet of Things (IOT) domain, there may be omnidirectional video capture devices which can capture at multiple resolutions. For example, two or more cameras may be connected to a single Jetson platform device, where different cameras may capture with different resolutions. It may be highly beneficial to exploit the delivery of mixed resolution content with higher efficiency and flexibility to maximize the end user quality of experience. The mixed resolution content may be such that the higher resolution may be used to represent the high-quality region (HQ region) corresponding to the viewport region and the margins. The lower resolution may be used to cover the content which is not the viewport region. The mixed resolution content may comprise content of two or more resolutions. Example embodiments of the present disclosure may relate to utilization of the delivered resolution.

Viewport dependent delivery (VDD) with a static tiling grid that is independent of the viewer's head motion may result in reduced bandwidth efficiency, as well as a reduced viewing experience. The reduced efficiency may be due to a suboptimal use of bitrate, as well as suboptimal use of the delivered encoded frame real-estate, or pixel space. For example, "wastage" is defined as bitrate used to deliver content which is not viewed. Similarly, "pixel wastage" is defined as pixels delivered in the encoded frame, as part of viewport dependent delivery, which are not viewed (or covered with viewport). In other words, static tiling VDD may result in a suboptimal use of bitrate and the pixels (in the delivered video frame) may result in delivery of unnecessary information. The reduced viewing experience (i.e. without the use of dynamic mixed resolution delivery) may be due to the reduced portion of a given frame resolution allotted to the current viewport. In other words, because a smaller spatial portion of a delivered frame includes information that a user actually views, the quality of what the user views may be less than in a case in which the entire (or a higher portion) of the delivered frame includes information that the user actually views: when more information of the delivered frame relates to the current viewport, the quality/resolution of that viewport may increase.

A technical effect of example embodiments of the present disclosure may be to address the problem of optimal real estate use of the delivered encoded video frame, as well as maximizing resolution for the viewed content, while maintaining a low risk of motion to high quality delay occurrences.

Example embodiments of the present disclosure may involve mixed resolution tile merging in VDD. Example embodiments of the present disclosure may depend, at least partially, on the expected head motion of a user. Example embodiments of the present disclosure may involve basing the packing/encoding behavior of a sender/encoder UE on head motion characteristics. In other words, in example embodiments of the present disclosure, head motion characteristics of a user may influence/serve to modify the packing scheme of a sender/encoder UE. For example, selection of source resolutions (i.e. capture of content at a selected mix of resolutions) may be head motion dependent. For example, a mix of 8K and 4K resolutions: 6K and 4K resolutions: 6K and 3K resolutions: etc. may be selected. In another example, selection of a packing scheme, from the set of available resolutions, may be head motion dependent. For example, the packing scheme may be selected from the set of available resolutions. Selection of the mix of resolutions and of a packing scheme may be considered two levels of modification dependent on head motion. Example embodiments of the present disclosure may relate to a dependency between viewport region size delivery in a given frame (i.e. change in delivered frame space for viewport vs non-viewport/background content) and a change in head motion. In another example embodiment, there may be a dependency between the HQ region size delivery in a given frame and the expected head motion, where the HQ region may comprise a viewport and margin.

Features as described herein generally relate to providing for dynamic tiling and merging. Example embodiments of the present disclosure may support variant bitrate and/or video resolution of the viewport region in the delivered video frame, such that they may be proportional (or inversely proportional) to the amount of head motion of the user. The amount of head motion may comprise at least one or more of the following: velocity, frequency, extent, a combination of these values, etc. Example embodiments of the present disclosure may enable dynamic tiling, based on head motion prediction, for selecting the bitrate and resolution of the margins in the delivered video frame. A technical effect of example embodiments of the present disclosure may be to achieve more effective bandwidth utilization (or reduced wastage) and greater effective resolution to/in the viewport region. Example embodiments of the present disclosure may involve allocating greater bandwidth and frame portion/real estate for the viewport in the delivered video frame.

In an example embodiment, the resolution and bitrate of the viewport in the delivered video frame may be proportional (or inversely proportional) to the probability of change in viewport, or prediction of viewports.

In another example embodiment, at least one of the resolution or the bitrate of the viewport region may be dependent on the amount of head motion, or probability of change in viewport.

In some example embodiments, the viewport and margin of a frame may be proportional (or inversely proportional) to the head motion, or probability of change in viewport, or extent of viewport change.

In an example embodiment, a threshold for different head motion speed(s) or frequency(ies) may be derived by the sender UE, or agreed as part of session negotiation, based on one or more of the following: speed of head motion; frequency of head motion: or extent of head motion.

In the present disclosure, the term "sender UE" may be used to indicate a UE, which may be a UE according to FIG. 1, which may be capable of selecting a resolution and/or frame packing scheme for a frame of VDD, and/or performing packing and merging of the frame of VDD for transmission to a receiver UE. The sender UE may be able to receive or determine information about a receiver UE viewport and/or information about changes in the viewport/user movement. The sender UE may or may not be configured to perform encoding of immersive content. The sender UE may or may not be configured to perform capture or generation of immersive content. The sender UE may be able to select the content capture resolution(s) which may be encoded with motion constrained tiles, which may permit merging of the tiles to generate a bitstream, which may be decoded by a single decoder instance. The sender UE may be capable of describing the packing scheme and representing it as region wise packing information (e.g., as region-wise SEI message, RTP header extension to describe the packing, etc.).

In the present disclosure, the term "receiver UE" may be used to indicate a UE, which may be a UE according to FIG. 1, which may be capable of determining or receiving the viewport of a user and communicating that information to a sender UE. The receiver UE may or may not be able to receive an encoded bitstream comprising frames packed according to example embodiments of the present disclosure. The receiver UE may or may not be able to decode, unpack, project, and/or render immersive/omnidirectional content. The UE may be able to understand the delivered packing information as SEI message, RTP header extension, etc.

A technical effect of example embodiments of the present disclosure may be to provide optimal bandwidth and frame portion (i.e. pixel domain) utilization for viewport. A technical effect of example embodiments of the present disclosure may be to minimize wastage by seamlessly switching from viewport independent low quality delivery (e.g. for highest motion) and delivering highest resolution viewport (e.g. when there is no motion). A technical effect of example embodiments of the present disclosure maybe to combine the freedom of movement required for omnidirectional video delivery, and maximize resolution analogous to limited field of view (FOV) content delivery.

Figure 2:
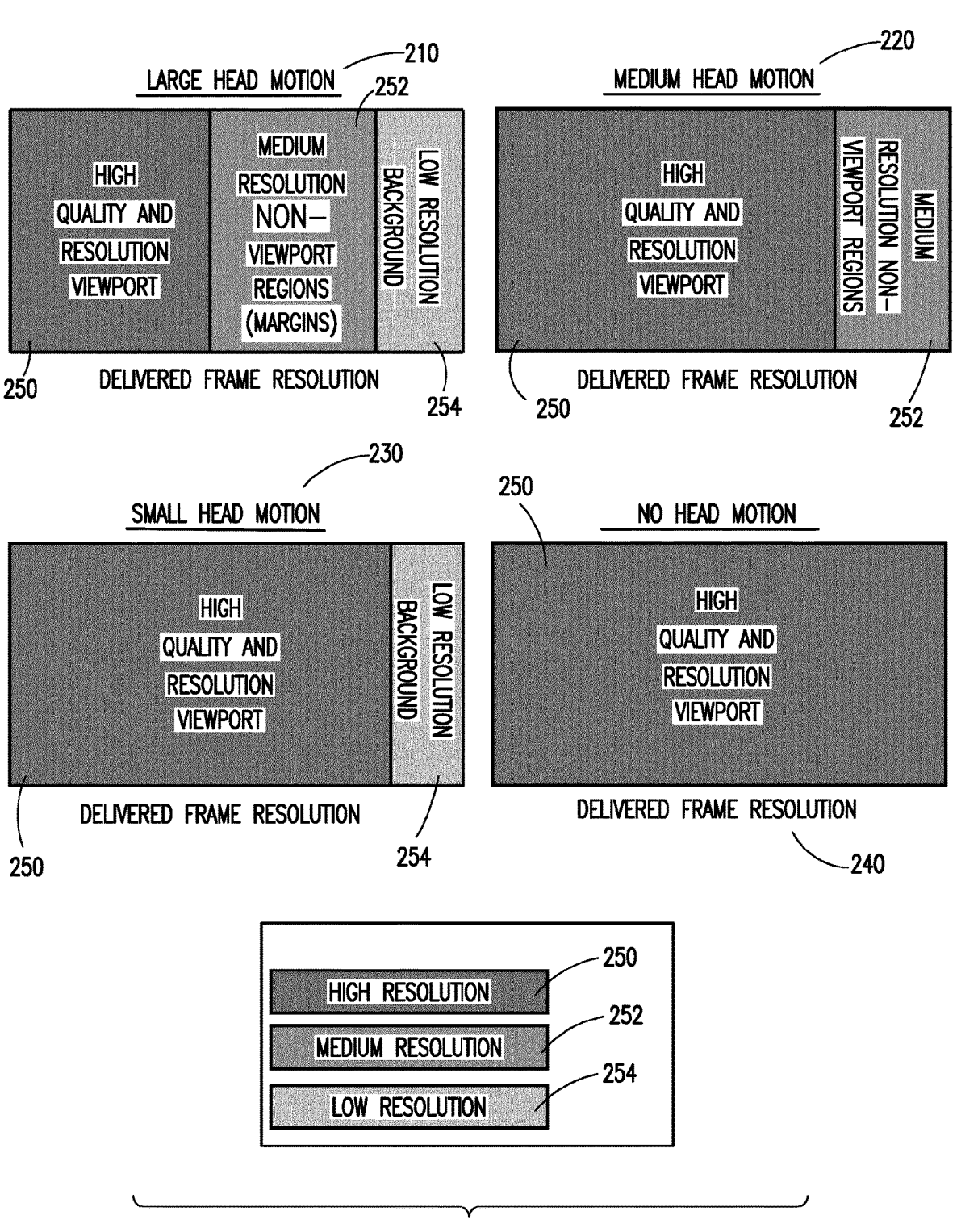
FIG. 2 is a diagram illustrating features as described herein.

Referring now to FIG. 2, illustrated is a conceptual representation of example embodiments of the present disclosure. FIG. 2 illustrates examples of mixed resolution tile merging to obtain/determine a head motion dependent viewport region in a frame packed VDD. At 210, 220, 230, and 240, the delivered video frame is represented as a rectangle which comprises one or more packed regions of one or more resolutions. In an example embodiment, the resolution corresponding to the viewport region may be provided with a higher area/real estate of the delivered video frame if the non-viewport region of the omnidirectional video is less likely to be required due to head motion of a user to whom the viewport is to be presented.

Different mixed resolution examples are illustrated in FIG. 2. At 210, illustrated is an example of a delivered video frame where large head motion is detected. The frame includes a high quality and resolution viewport area (250), a medium resolution non-viewport regions/margins area (252), and a low resolution background area (254). It should be noted that the arrangement of these different areas in the frame is illustrative and not limiting: a different arrangement of the same or different areas may be possible. The low resolution background (254) may comprise immersive content that is entirely overlapping, entirely non-overlapping, or partially overlapping with immersive content included in the frame with another resolution(s).

In contrast to the large head motion case 210, the medium head motion case 220 illustrates a frame with a large portion of the area of the frame carrying high quality and resolution viewport content (250), and a smaller portion of the area of the frame carrying medium resolution non-viewport regions (252). The relationship between head motion and the selected resolution packing scheme for the delivered video frame is further illustrated at 230, a case of small head motion, where the frame includes a large area carrying high quality and resolution viewport content (250), and a small area carrying low resolution background content (254). The relationship between head motion and the selected resolution packing scheme for the delivered video frame is further illustrated at 240, a case of no head motion, where only high quality and resolution viewport content is included in the delivered video frame. In another example embodiment, in case of no head motion, the margin i.e. region in addition to the viewport may be reduced to a predefined minimum greater than zero (i.e. some non-viewport content may be included).

In an example embodiment, in extreme case of high head motion, the delivered frame may converge to viewport independent delivery mode with low resolution (250). In another example embodiment, a lower bound of frame space may be allocated to the viewport, and a large part of the frame space may be allocated to cover a greater portion of the omnidirectional sphere.

Figure 3:
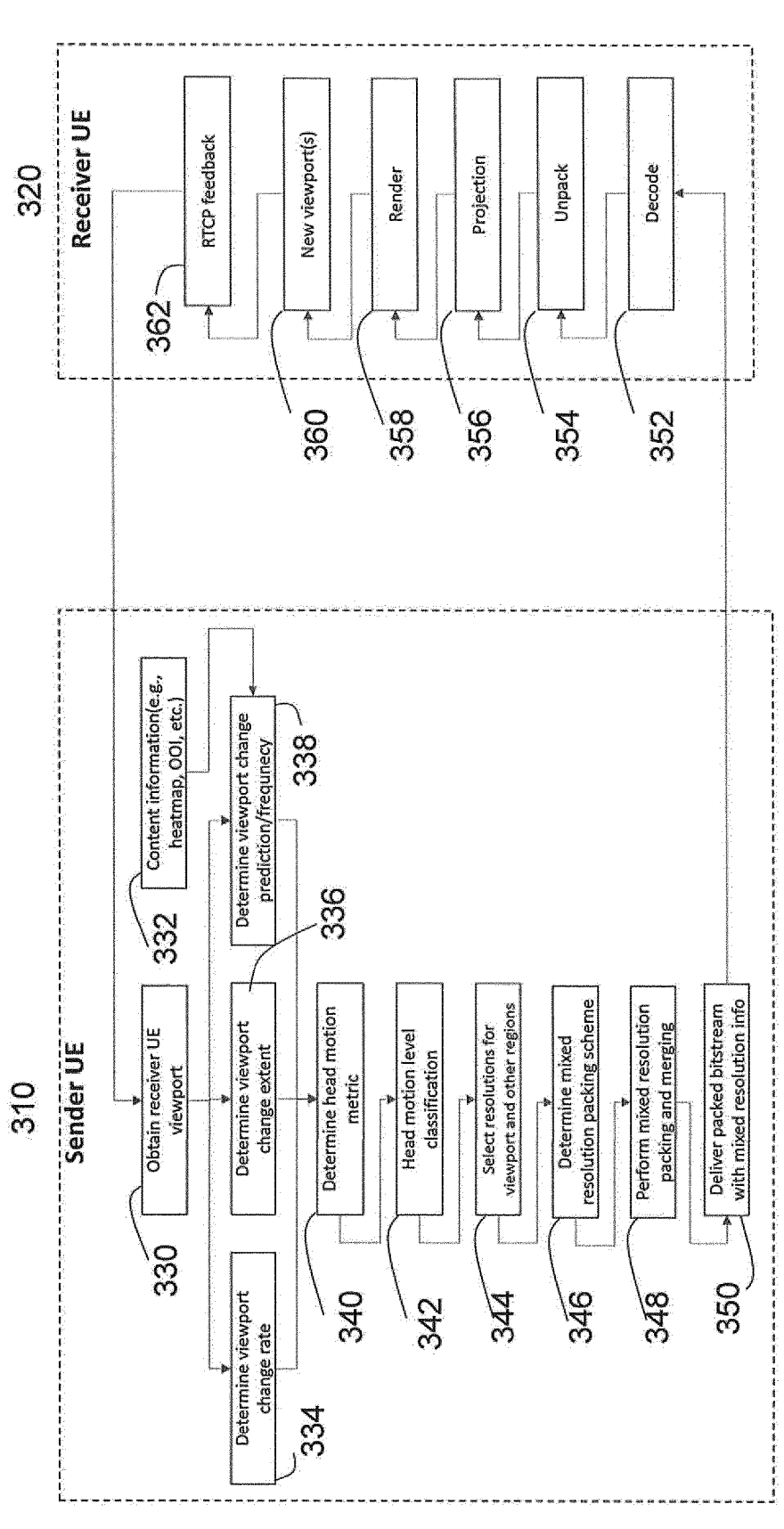
FIG. 3 is a diagram illustrating features as described herein.

Referring now to FIG. 3, illustrated is a flow diagram of the end to end system implementation steps. FIG. 3 illustrates steps involved in head motion dependent tile merging according to one or more example embodiments of the present disclosure. FIG. 3 includes a sender UE 310 and a receiver UE 320, which may be enabled to communicate with each other. While FIG. 3 illustrates direct communication between sender UE 310 and receiver UE 320, it may be possible for information to be stored at another device or module prior to provision of the information to one of sender UE 310 or a receiver UE 320. It may also be possible for information to be transmitted between sender UE 310 and receiver UE 320 via another device. It may also be possible for one or more of the functions illustrated as being performed at sender UE 310 or receiver UE 320 to be performed at another device, which may then provide the result of the function to sender UE 310 or receiver UE 320.

The sender UE 310 may determine head motion statistics/metrics (334, 336, 338) based on the receiver UE 320 viewport information obtained at 330 and content dependent information 332, such as objects of interest information (OOI) or heatmap information, in case of on-demand content. The head motion metric calculation (334, 336, 338) may be performed based on causal analysis, i.e. past and current viewport information, prediction based on causal data and content analysis (e.g., object of interest, crowd-sourced heatmaps, etc.).

In an example, in case of on-demand content, viewport trajectories of the users who have consumed the content may be used to generate a heatmap of the expected regions, or viewport trajectories, of the current user's viewport changes. This heatmap may provide information for predicting movement and may be used to determine head motion statistics/metrics.

At 334, the viewport change rate may be determined. This may be determined based on current viewport information as well as past viewport information. Additionally or alternatively, this may be determined based on speed/velocity information determined based on UE movement. At 336, the viewport change extent may be determined. This may be determined based on current viewport information as well as past viewport information. Additionally or alternatively, this may be determined based on a OOI information, such as tracking of an object in relation to a user, or determining a relationship between an object in immersive content and the current/previous viewport of the user. At 338, the viewport change/prediction frequency may be determined. This may be determined based on historical information or limited past (temporal duration) information about the viewport.

At 340, the head motion metric may be determined. The head motion metric may depend on the expected viewport change extent or span (336), viewport change rate or velocity (334), and/or viewport change frequency (338). The larger the extent or span (336), the greater a margin that may be determined to be included in the delivered frame.

At 342, the head motion level may be classified. The head motion may be classified into saccades type movement (i.e. fast movement followed by stable viewport), gradual viewport translation, and localized to and fro movement, etc. Thus, extent (336) and velocity (334) may together be used as a source metric for determination of thresholds for head motion level classification. In other words, threshold values for head motion speed, extent, or a weighted combination of values, may be predetermined by a sender UE based on past user behavior: these threshold values may be used to classify current head motion. In an example embodiment, the head motion metric may be the viewport change speed (e.g. degrees/second) (334) and viewport change extent (e.g., saccade length in degrees) (336). First, a viewport change speed threshold may be used: above a certain viewport change speed threshold, the extent may also be considered in classifying the head motion level. In other words, the threshold values for speed, extent, frequency, etc. may be used in a cascade manner (i.e. after the other) to determine/classify the head motion level/class.

The head motion statistics/metrics may be derived (334, 336, 338) by the sender-UE/server/encoder or the entity which does the merging and packing (348). These may or may not be the same entity. The head motion statistics/metrics may be derived (334, 336, 338) based on: current viewport information delivered by the receiver UE 320 (362, 330): current viewport and potential viewport changes delivered by the receiver UE 320 (362, 330): estimated viewport changes determined by the sender UE 310 (338) based on the current viewport information received from receiver UE 320 (362, 330).

The head motion metrics/statistics may be classified (342) based on predetermined thresholds based on heuristics for the specific content type. The head motion classification can consist of the following classes: static or low head motion: slow head motion; moderate head motion: high speed and large extent: etc. There may be one or more predetermined thresholds associated with each of these classes. For example, there may be a threshold change rate/speed value associated with static or low head motion vs. slow head motion, where a change rate/speed below the threshold may be classified as a static or low head motion, where a change rate/speed equal to or above the threshold may be classified as a slow head motion.

In an example, a value of velocity less than 5 degrees/second and extent of less than 15 degrees may be classified as "low." In an example, a value of velocity between 5 degrees/second and 15 degrees/second and extent greater than 15 degrees may be classified as "medium." In an example, a velocity of greater than 15 degrees/sec and extent greater than 15 degrees may be classified as "high."

In another example embodiment, there may be another set of head motion classification levels or classes, such as "No motion with clear visual quality", "Slow motion with clear visual quality", "Medium motion with clear visual quality", "High motion with clear visual quality", "High motion with low visual quality", etc. as a result of head motion induced blurring vision. There may be one or more predetermined thresholds associated with each of these criteria.

In an example embodiment, the classifier (342) may determine other classes which are in synch with user preferences. For example, some users may prefer more frequent low-quality viewports in lieu of not compromising the visual resolution. In contrast, other users may prefer a balance of resolution and infrequent low-quality viewports. These user preferences may affect the packing strategy, which enhances the portion of delivered frame for a given head motion level or class by prioritizing viewport resolution over minimizing the motion to low quality events or head motion to high quality delay. In other words, the classes may be considered in a non-limiting manner.

The head motion classification (342) may be used to select suitable resolutions from the available candidate resolutions. In case of IOT video capture devices, multiple camera sensors may be connected to provide a broad range of options in terms of resolutions. Additionally or alternatively, resampling of the highest resolution capture sensor may be used to provide a range of resolutions. At 344, resolutions for viewport and other regions of the immersive content may be selected. This may be performed based on the head motion level classification at 342.

At 346, a mixed resolution packing scheme may be determined. This may be performed based on the resolutions for viewport and other regions of the immersive content selected at 344. This may involve determining whether any regions of the immersive content will be included in the frame besides the viewport (i.e. choosing which resolution levels to include). The mixed resolution packing scheme may be determined in order to maximize the utilization of the delivered video frame portion/area for the viewport, without heavily compromising the ability to respond to head motion without loss of quality.

At 348, mixed resolution packing and merging may be performed. It may be noted that, if only the viewport at a high resolution is to be included in the frame, the packing and merging may not be packing and merging of mixed resolutions, but rather of a single resolution. The packing and merging may be performed based on the determined mixed resolution packing scheme at 346. The mixed resolution packing and merging may be performed to deliver a bitstream which can be decoded by a single decoder (e.g. 352). At 350, the packed bitstream with mixed resolution info may be delivered to the receiver UE 320.

In an example embodiment, the head motion may be continuously evaluated (334, 336, 338) in order to modify the frame packing prioritization for high and low resolution content in mixed resolution packing scheme (344, 346).

At 352, the receiver UE 320 may decode the packed bitstream. At 354, the receiver UE 320 may unpack the decoded bitstream. At 356, the receiver UE 320 may project the unpacked frames of the decoded bitstream. At 358, the receiver UE 320 may render the frames of omnidirectional/immersive content. The rendering may be performed based on a current viewport of the user. In case of overlap in between the regions with two or more resolutions, the higher resolution may be rendered later to ensure it is in the foreground of the rendering mesh.

At 360, the receiver UE 320 may determine one or more new viewports of the user. This user viewport information may be sent to the sender UE 310 as real-time transport control protocol (RTCP) feedback, 362.

Figures 4A, 4B:
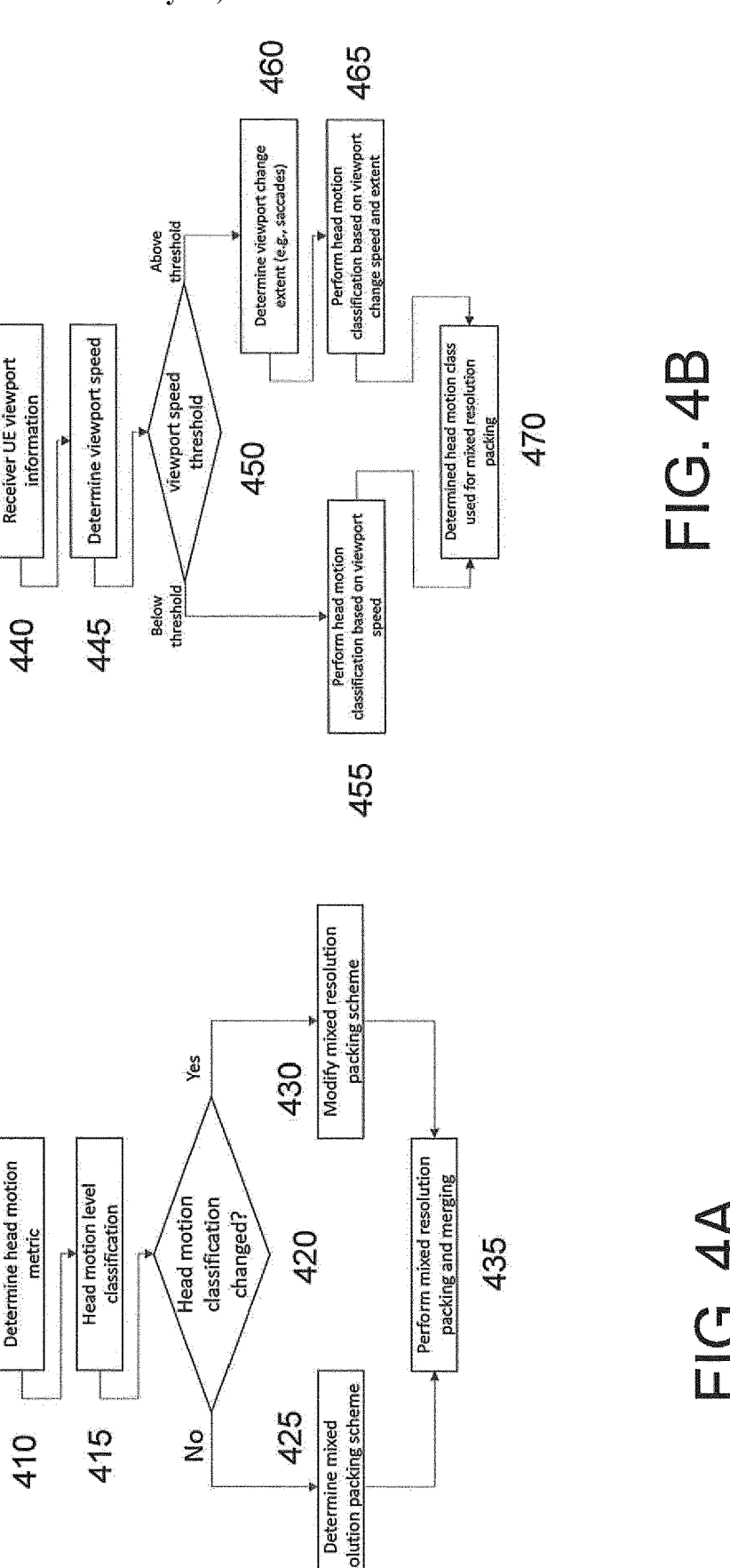
FIG. 4A is a diagram illustrating features as described herein.
FIG. 4B is a diagram illustrating features as described herein.

Referring now to FIG. 4a, illustrated is flow diagram for modifying the mixed/multi-resolution packing scheme depending on a change in the head motion metric classification. Example embodiments of the present disclosure may enable leveraging of delivered frame(s) based on head motion. The steps of FIG. 4a may, for example, be performed with a sender UE. At 410, a head motion metric may be determined. At 415, head motion level classification may be performed. At 420, it may be determined whether the head motion classification has changed. This may performed by comparing the head motion level classification determined at 415 with a previously determined head motion level classification. If the head motion classification has not changed, at 425, the mixed resolution packing scheme may be determined based on a previously determined mixed resolution packing scheme. If the head motion classification has changed, at 430, the mixed resolution packing scheme may be modified/changed. At 435, the mixed resolution packing scheme, as determined or modified, may be performed, and merging may be performed.

Referring now to FIG. 4b, illustrated is flow diagram for performing head motion metric classification. Example embodiments of the present disclosure may enable leveraging of delivered frame(s) based on head motion. The steps of FIG. 4b may, for example, be performed with a sender UE. At 440, receiver UE viewport information may be received. At 445, viewport speed may be determined based on the received viewport information. At 450, the determined viewport speed may be compared with a viewport speed threshold. If the determined viewport speed is below the viewport speed threshold, at 455, head motion classification may be performed based on the viewport speed. If the determined viewport speed is above the viewport speed threshold, at 460, the viewport change extent (e.g. saccades) may be determined. At 645, head motion classification may be performed based on the viewport change speed and the extent. At 470, the determined dead motion class may be used for mixed resolution packing.

Referring now to FIG. 5, illustrated are examples of mixed resolution tile packing and merging modification based on head motion metrics/viewport change classification. 510 is an example of a high encoding resolution of 7680×4608=20×18 (384×256) and tiles covering a low extent, 18×10 degrees. 540 is an example of medium encoding resolution of 6144×3072=16×12 (384×256) and tiles covering a medium extent, 22.5×15 degrees. 560 is an example of low encoding resolution of 3072×1536=8×6 (384×256) and tiles covering a high extent, 45×30 degrees. The encoding resolutions are summarized at 580. In the case of static or low head motion, at 520, a large portion of the frame may comprise high resolution content, similar to 510. 520 may be compared with 240 of FIG. 2. In the case of slow head motion, at 530, a large portion of the frame may comprise high resolution content, similar to 510, and a small portion of the frame may comprise low resolution content, similar to 560. 530 may be compared with 230 of FIG. 2. In the case of moderate head motion, at 550, some of the frame area may comprise medium resolution content, similar to 540, while some of the frame area may comprise low resolution content, similar to 560. 550 may be compared with 220 of FIG. 2. In the case of high speed and extent head motion, at 570, the frame area may comprise low resolution content, similar to 560. 570 may be compared with 210 of FIG. 2. In this example, the delivery resolution of the examples 520, 530, 550, and 570 is 3840×2048=10×8 (384× 256), and the viewport size is 90×90.

It may be noted that, in the example of FIG. 5, the viewport region may use high resolution encoded content to pack the delivered frame resolution (e.g. at 520), while the resolution may be reduced for the viewport region to enable packing larger field of view in the delivered frame (e.g. 550, 570). The example resolutions and tiling may depend, at least partially, on the available capture sensor capability and/or encoder. Different tiling schemes may be used. The examples may indicate an ERP, but the same principle may be applied to omnidirectional videos projected with other methods (e.g., Cubemap).

A session initiation protocol (SIP) session may be negotiated with a session attribute indicating head motion dependent mixed resolution. A sender UE that supports this feature may include this attribute in the offer, and the receiver UE that is able to handle such content may respond by retaining the attribute. If the receiver UE is not able to handle such content, the attribute may not be retained in the response. This exchange of capability information may be required because the packing information may change in runtime during the session. In another embodiment, a conversational media session between two or more UEs where the sender UE supports mixed resolution tile packing and the receiver UE is able to unpack the packed picture, this method may be used. The packing and unpacking information, if delivered in band (e.g., as SEI message or RTP header extension), may change for every delivered video frame.

FIG. 6 illustrates the potential steps of an example method 600. The example method 600 may include: determining one or more head motion statistics for rendering immersive content, 610; determining a classification of a head motion based, at least partially, on the one or more determined head motion statistics, 620: selecting at least one resolution for at least part of the immersive content based, at least partially, on the determined classification, 630; determining a packing scheme based, at least partially, on the at least one selected resolution and the determined classification, 640; and performing packing of the immersive content in at least one frame based, at least partially, on the determined packing scheme, 650.

Figure 7:
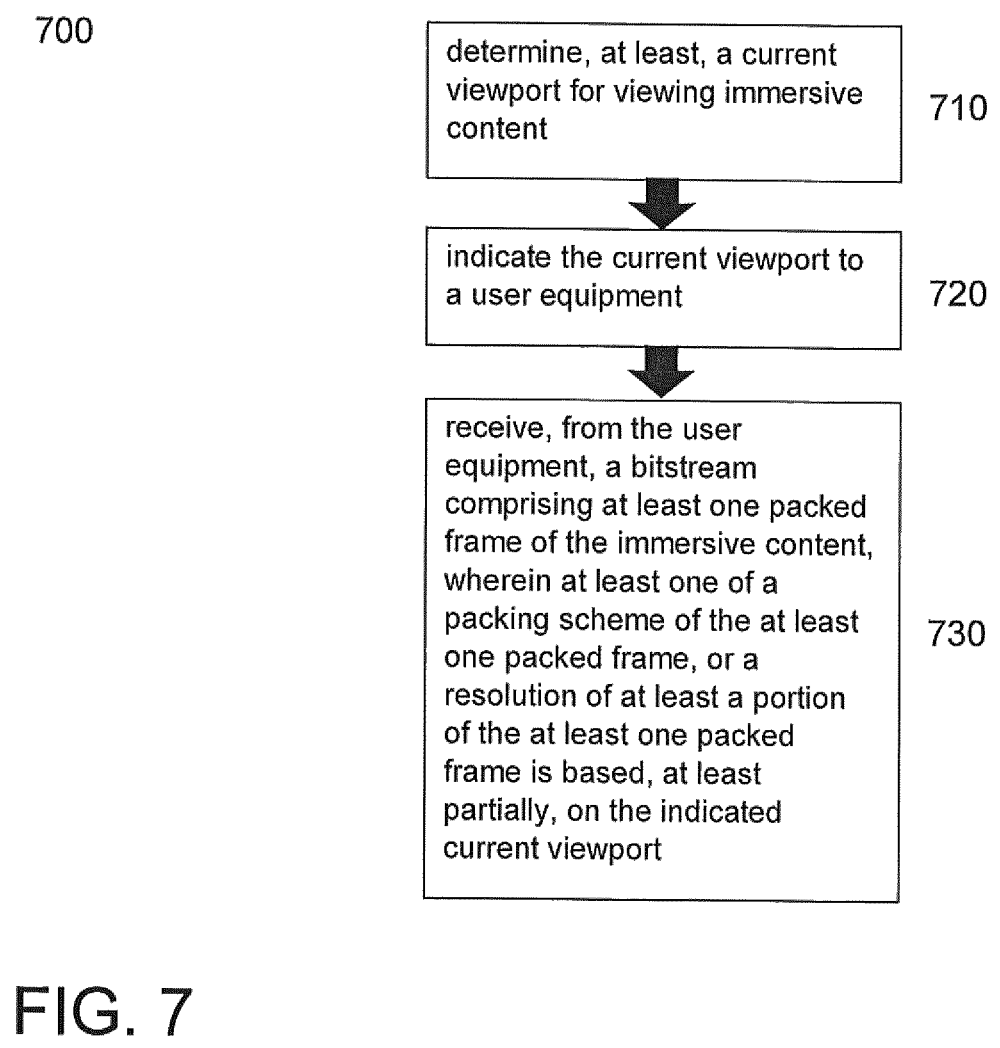

FIG. 7 illustrates the potential steps of an example method 700. The example method 700 may include: determining, at least, a current viewport for viewing immersive content. 710: indicating the current viewport to a user equipment, 720; and receiving, from the user equipment, a bitstream comprising at least one packed frame of the immersive content, wherein at least one of a packing scheme of the at least one packed frame, or a resolution of at least a portion of the at least one packed frame is based, at least partially, on the indicated current viewport, 730.

In accordance with one example embodiment, an apparatus may comprise: at least one processor; and at least one memory including computer program code: the at least one memory and the computer program code configured to, with the at least one processor, cause the apparatus at least to perform: determine one or more head motion statistics for rendering immersive content: determine a classification of a head motion based, at least partially, on the one or more determined head motion statistics: select at least one resolution for at least part of the immersive content based, at least partially, on the determined classification: determine a packing scheme based, at least partially, on the at least one selected resolution and the determined classification; and perform packing of the immersive content in at least one frame based, at least partially, on the determined packing scheme.

Determining the classification of the head motion may be based on at least one comparison of at least one head motion statistic of the one or more determined head motion statistics with at least one threshold value.

Determining the one or more head motion statistics for rendering the immersive content may comprise the example apparatus being further configured to: determine at least one of: a viewport change rate, a viewport change speed, a viewport change velocity, a viewport change extent, a viewport change frequency, a speed of the head motion, a frequency of the head motion, or an extent of the head motion.

Determining the one or more head motion statistics may be based, at least partially, on at least one of: current viewport information, historical viewport information, object of interest information, a heatmap, content analysis of the immersive content, causal data, and indication of a potential change of a viewport, or an estimated viewport change.

Determining the classification of the head motion may comprise classifying the head motion as one of: a static or low head motion, a slow head motion, a moderate head motion, a high speed head motion with a large extent, no motion with clear visual quality, a slow motion with clear visual quality, a medium motion with clear visual quality, a high motion with clear visual quality, or a high motion with low visual quality.

The example apparatus may be further configured to: indicate, to a user equipment, a capability of the apparatus to perform head motion dependent mixed resolution packing; and receive, from the user equipment, an indication to perform head motion dependent mixed resolution packing.

The example apparatus may be further configured to: transmit the packed immersive content to a user equipment.

The example apparatus may be further configured to: determine the one or more head motion statistics for rendering the immersive content based, at least partially, on viewport information received from a user equipment.

Determining the packing scheme may be further based on a determination of whether the classification of the head motion has changed.

The at least part of the immersive content may correspond to a viewport.

In accordance with one aspect, an example method may be provided comprising: determining one or more head motion statistics for rendering immersive content: determining a classification of a head motion based, at least partially, on the one or more determined head motion statistics: selecting, with a user equipment, at least one resolution for at least part of the immersive content based, at least partially, on the determined classification: determining a packing scheme based, at least partially, on the at least one selected resolution and the determined classification; and performing packing of the immersive content in at least one frame based, at least partially, on the determined packing scheme.

The determining of the classification of the head motion may be based on at least one comparison of at least one head motion statistic of the one or more determined head motion statistics with at least one threshold value.

The determining of the one or more head motion statistics for rendering the immersive content may comprise determining at least one of: a viewport change rate, a viewport change speed, a viewport change velocity, a viewport change extent, a viewport change frequency, a speed of the head motion, a frequency of the head motion, or an extent of the head motion.

The determining of the one or more head motion statistics may be based, at least partially, on at least one of: current viewport information, historical viewport information, object of interest information, a heatmap, content analysis of the immersive content, causal data, and indication of a potential change of a viewport, or an estimated viewport change.

The determining of the classification of the head motion may comprise classifying the head motion as one of: a static or low head motion, a slow head motion, a moderate head motion, a high speed head motion with a large extent, no motion with clear visual quality, a slow motion with clear visual quality, a medium motion with clear visual quality, a high motion with clear visual quality, or a high motion with low visual quality.

The example method may further comprise: indicating, to a further user equipment, a capability of the user equipment to perform head motion dependent mixed resolution packing; and receiving, from the further user equipment, an indication to perform head motion dependent mixed resolution packing.

The example method may further comprise: transmitting the packed immersive content to a further user equipment.

The example method may further comprise: determining the one or more head motion statistics for rendering the immersive content based, at least partially, on viewport information received from a further user equipment.

The determining of the packing scheme may be further based on a determination of whether the classification of the head motion has changed.

The at least part of the immersive content may correspond to a viewport.

In accordance with one example embodiment, an apparatus may comprise: circuitry configured to perform: determine one or more head motion statistics for rendering immersive content; determine a classification of a head motion based, at least partially, on the one or more determined head motion statistics: select at least one resolution for at least part of the immersive content based, at least partially, on the determined classification: determine a packing scheme based, at least partially, on the at least one selected resolution and the determined classification; and perform packing of the immersive content in at least one frame based, at least partially, on the determined packing scheme.

In accordance with one example embodiment, an apparatus may comprise: processing circuitry: memory circuitry including computer program code, the memory circuitry and the computer program code configured to, with the processing circuitry, enable the apparatus to: determine one or more head motion statistics for rendering immersive content: determine a classification of a head motion based, at least partially, on the one or more determined head motion statistics: select at least one resolution for at least part of the immersive content based, at least partially, on the determined classification: determine a packing scheme based, at least partially, on the at least one selected resolution and the determined classification; and perform packing of the immersive content in at least one frame based, at least partially, on the determined packing scheme.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: determining one or more head motion statistics for rendering immersive content; determining a classification of a head motion based, at least partially, on the one or more determined head motion statistics: selecting at least one resolution for at least part of the immersive content based, at least partially, on the determined classification: determining a packing scheme based, at least partially, on the at least one selected resolution and the determined classification; and performing packing of the immersive content in at least one frame based, at least partially, on the determined packing scheme.

The means configured to perform determining of the classification of the head motion may be configured to perform the determining based on at least one comparison of at least one head motion statistic of the one or more determined head motion statistics with at least one threshold value.

The means configured to perform determining of the one or more head motion statistics for rendering the immersive content may comprise means configured to perform determining at least one of: a viewport change rate, a viewport change speed, a viewport change velocity, a viewport change extent, a viewport change frequency, a speed of the head motion, a frequency of the head motion, or an extent of the head motion.

The means configured to perform determining of the one or more head motion statistics may be configured to perform the determining based, at least partially, on at least one of: current viewport information, historical viewport information, object of interest information, a heatmap, content analysis of the immersive content, causal data, and indication of a potential change of a viewport, or an estimated viewport change.

The means configured to perform determining of the classification of the head motion may comprise means configured to perform classifying the head motion as one of:

a static or low head motion, a slow head motion, a moderate head motion, a high speed head motion with a large extent, no motion with clear visual quality, a slow motion with clear visual quality, a medium motion with clear visual quality, a high motion with clear visual quality, or a high motion with low visual quality.

The means may be further configured to perform: indicating, to a user equipment, a capability of the apparatus to perform head motion dependent mixed resolution packing; and receiving, from the user equipment, an indication to perform head motion dependent mixed resolution packing.

The means may be further configured to perform: transmitting the packed immersive content to a user equipment.

The means may be further configured to perform: determining the one or more head motion statistics for rendering the immersive content based, at least partially, on viewport information received from a user equipment.

The means configured to perform determining of the packing scheme may be configured to perform determining based on a determination of whether the classification of the head motion has changed.

The at least part of the immersive content may correspond to a viewport.

In accordance with one example embodiment, a non-transitory computer-readable medium comprising program instructions stored thereon which, when executed with at least one processor, cause the at least one processor to: determine one or more head motion statistics for rendering immersive content: determine a classification of a head motion based, at least partially, on the one or more determined head motion statistics: select at least one resolution for at least part of the immersive content based, at least partially, on the determined classification: determine a packing scheme based, at least partially, on the at least one selected resolution and the determined classification; and perform packing of the immersive content in at least one frame based, at least partially, on the determined packing scheme.

Determining the classification of the head motion may be based on at least one comparison of at least one head motion statistic of the one or more determined head motion statistics with at least one threshold value.

Determining the one or more head motion statistics for rendering the immersive content may comprise the example non-transitory computer-readable medium being further configured to: determine at least one of: a viewport change rate, a viewport change speed, a viewport change velocity, a viewport change extent, a viewport change frequency, a speed of the head motion, a frequency of the head motion, or an extent of the head motion.

Determining the one or more head motion statistics may be based, at least partially, on at least one of: current viewport information, historical viewport information, object of interest information, a heatmap, content analysis of the immersive content, causal data, and indication of a potential change of a viewport, or an estimated viewport change.

Determining the classification of the head motion may comprise classifying the head motion as one of: a static or low head motion, a slow head motion, a moderate head motion, a high speed head motion with a large extent, no motion with clear visual quality, a slow motion with clear visual quality, a medium motion with clear visual quality, a high motion with clear visual quality, or a high motion with low visual quality.

The example non-transitory computer-readable medium may be further configured to: indicate, to a user equipment, a capability of the apparatus to perform head motion dependent mixed resolution packing; and receive, from the user equipment, an indication to perform head motion dependent mixed resolution packing.

The example non-transitory computer-readable medium may be further configured to: transmit the packed immersive content to a user equipment.

The example non-transitory computer-readable medium may be further configured to: determine the one or more head motion statistics for rendering the immersive content based, at least partially, on viewport information received from a user equipment.

Determining the packing scheme may be further based on a determination of whether the classification of the head motion has changed.

The at least part of the immersive content may correspond to a viewport.

In accordance with another example embodiment, a non-transitory program storage device readable by a machine may be provided, tangibly embodying a program of instructions executable by the machine for performing operations, the operations comprising: determine one or more head motion statistics for rendering immersive content: determine a classification of a head motion based, at least partially, on the one or more determined head motion statistics: select at least one resolution for at least part of the immersive content based, at least partially, on the determined classification: determine a packing scheme based, at least partially, on the at least one selected resolution and the determined classification; and perform packing of the immersive content in at least one frame based, at least partially, on the determined packing scheme.

In accordance with one example embodiment, an apparatus may comprise: at least one processor; and at least one memory including computer program code: the at least one memory and the computer program code configured to, with the at least one processor, cause the apparatus at least to perform: determine, at least, a current viewport for viewing immersive content: indicate the current viewport to a user equipment; and receive, from the user equipment, a bitstream comprising at least one packed frame of the immersive content, wherein at least one of a packing scheme of the at least one packed frame, or a resolution of at least a portion of the at least one packed frame may be based, at least partially, on the indicated current viewport.

The example apparatus may be further configured to: receive an indication of a capability of the user equipment to perform head motion dependent mixed resolution packing; and transmit an indication for the user equipment to perform head motion dependent mixed resolution packing.

The example apparatus may be further configured to: decode the received bitstream; and unpack the at least one packed frame.

The at least one packed frame may comprise mixed resolution content.

The example apparatus may be further configured to: receive an indication of the packing scheme of the at least one frame; and unpack the at least one packed frame based, at least partially, on the received indication.

The example apparatus may be further configured to: receive an indication that the packing scheme of the at least one packed frame has changed; and unpack the at least one packed frame based, at least partially, on the received indication.

In accordance with one aspect, an example method may be provided comprising: determining, at least, a current viewport for viewing immersive content: indicating the current viewport to a user equipment; and receiving, from the user equipment, a bitstream comprising at least one packed frame of the immersive content, wherein at least one of a packing scheme of the at least one packed frame, or a resolution of at least a portion of the at least one packed frame may be based, at least partially, on the indicated current viewport.

The example method may further comprise: receiving an indication of a capability of the user equipment to perform head motion dependent mixed resolution packing; and transmitting an indication for the user equipment to perform head motion dependent mixed resolution packing.

The example method may further comprise: decoding the received bitstream; and unpacking the at least one packed frame.

The at least one packed frame may comprise mixed resolution content.

The example method may further comprise: receiving an indication of the packing scheme of the at least one frame; and unpacking the at least one packed frame based, at least partially, on the received indication.

The example method may further comprise: receiving an indication that the packing scheme of the at least one packed frame has changed; and unpacking the at least one packed frame based, at least partially, on the received indication.

In accordance with one example embodiment, an apparatus may comprise: circuitry configured to perform: determine, at least, a current viewport for viewing immersive content: indicate the current viewport to a user equipment; and receive, from the user equipment, a bitstream comprising at least one packed frame of the immersive content, wherein at least one of a packing scheme of the at least one packed frame, or a resolution of at least a portion of the at least one packed frame is based, at least partially, on the indicated current viewport.

In accordance with one example embodiment, an apparatus may comprise: processing circuitry: memory circuitry including computer program code, the memory circuitry and the computer program code configured to, with the processing circuitry, enable the apparatus to: determine, at least, a current viewport for viewing immersive content: indicate the current viewport to a user equipment; and receive, from the user equipment, a bitstream comprising at least one packed frame of the immersive content, wherein at least one of a packing scheme of the at least one packed frame, or a resolution of at least a portion of the at least one packed frame is based, at least partially, on the indicated current viewport.

In accordance with one example embodiment, an apparatus may comprise means for performing: determining, at least, a current viewport for viewing immersive content: indicating the current viewport to a user equipment; and receiving, from the user equipment, a bitstream comprising at least one packed frame of the immersive content, wherein at least one of a packing scheme of the at least one packed frame, or a resolution of at least a portion of the at least one packed frame may be based, at least partially, on the indicated current viewport.

The means may be further configured to perform: receiving an indication of a capability of the user equipment to perform head motion dependent mixed resolution packing; and transmitting an indication for the user equipment to perform head motion dependent mixed resolution packing.

The means may be further configured to perform: decoding the received bitstream; and unpacking the at least one packed frame.

The at least one packed frame may comprise mixed resolution content.

The means may be further configured to perform: receiving an indication of the packing scheme of the at least one frame; and unpacking the at least one packed frame based, at least partially, on the received indication.

The means may be further configured to perform: receiving an indication that the packing scheme of the at least one packed frame has changed; and unpacking the at least one packed frame based, at least partially, on the received indication.

In accordance with one example embodiment, a non-transitory computer-readable medium comprising program instructions stored thereon which, when executed with at least one processor, cause the at least one processor to: determine, at least, a current viewport for viewing immersive content: indicate the current viewport to a user equipment; and receive, from the user equipment, a bitstream comprising at least one packed frame of the immersive content, wherein at least one of a packing scheme of the at least one packed frame, or a resolution of at least a portion of the at least one packed frame may be based, at least partially, on the indicated current viewport.

The example non-transitory computer-readable medium may be further configured to: receive an indication of a capability of the user equipment to perform head motion dependent mixed resolution packing; and transmit an indication for the user equipment to perform head motion dependent mixed resolution packing.

The example non-transitory computer-readable medium may be further configured to: decode the received bitstream; and unpack the at least one packed frame.

The at least one packed frame may comprise mixed resolution content.

The example non-transitory computer-readable medium may be further configured to: receive an indication of the packing scheme of the at least one frame; and unpack the at least one packed frame based, at least partially, on the received indication.

The example non-transitory computer-readable medium may be further configured to: receive an indication that the packing scheme of the at least one packed frame has changed; and unpack the at least one packed frame based, at least partially, on the received indication.

In accordance with another example embodiment, a non-transitory program storage device readable by a machine may be provided, tangibly embodying a program of instructions executable by the machine for performing operations, the operations comprising: determine, at least, a current viewport for viewing immersive content: indicate the current viewport to a user equipment; and receive, from the user equipment, a bitstream comprising at least one packed frame of the immersive content, wherein at least one of a packing scheme of the at least one packed frame, or a resolution of at least a portion of the at least one packed frame may be based, at least partially, on the indicated current viewport.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. An apparatus comprising:

at least one processor; and at least one memory storing instructions that, when executed with the at least one processor, cause the apparatus at least to:

determine one or more head motion statistics for rendering immersive content;

determine a classification of a head motion based, at least partially, on the one or more determined head motion statistics;

select at least one resolution for at least part of the immersive content based, at least partially, on the determined classification;

determine a packing scheme based, at least partially, on the at least one selected resolution and the determined classification, wherein the determined packing scheme is configured to define a number of resolutions packed in a frame based, at least partially, on the determined classification; and perform packing of the immersive content in at least one frame based, at least partially, on the determined packing scheme.

2. The apparatus of claim 1, wherein determination of the classification of the head motion is further based on at least one comparison of at least one head motion: statistic of the one or more determined head motion statistics with at least one threshold value.

3. The apparatus of claim 1, wherein to determine the one or more head motion statistics for rendering the immersive content, the apparatus is further caused to determine at least one of:

a viewport change rate;

a viewport change speed;

a viewport change velocity;

a viewport change extent;

a viewport change frequency;

a speed of the head motion;

a frequency of the head motion; or an extent of the head motion.

4. The apparatus of claim 1, wherein determination of the one or more head motion statistics is further based, at least partially, on at least one of:

current viewport information;

historical viewport information;

object of interest information;

a heatmap;

content analysis of the immersive content;

causal data;

an indication of a potential change of a viewport; or an estimated viewport change.

5. The apparatus of claim 1, wherein to determine the classification of the head motion, the apparatus is further caused to classify the head motion as one of:

a static or low head motion;

a slow head motion;

a moderate head motion;

a high speed head motion with a large extent;

no motion with clear visual quality;

a slow motion with clear visual quality;

a medium motion with clear visual quality;

a high motion with clear visual quality; or a high motion with low visual quality.

6. The apparatus of claim 1, wherein the instructions, when executed with the at least one processor, further cause the apparatus to:

indicate, to a user equipment, a capability of the apparatus to perform a head motion dependent mixed resolution packing; and receive, from the user equipment, an indication to perform the head motion dependent mixed resolution packing.

7. The apparatus of claim 1, wherein the instructions, when executed with the at least one processor, further cause the apparatus to:

transmit a packed immersive content to a user equipment.

8. The apparatus of claim 1, wherein the instructions, when executed with the at least one processor, cause the apparatus to:

determine the one or more head motion statistics for rendering the immersive content based, at least partially, on viewport information received from a user equipment.

9. The apparatus of claim 1, wherein determining the packing scheme is further based on a determination of whether the classification of the head motion has changed.

10. The apparatus of claim 1, wherein the at least part of the immersive content corresponds to a viewport.

11. A method comprising:

determining one or more head motion statistics for rendering immersive content;

determining a classification of a head motion based, at least partially, on the one or more determined head motion statistics;

selecting, with a user equipment, at least one resolution for at least part of the immersive content based, at least partially, on the determined classification;

determining a packing scheme based, at least partially, on the at least one selected resolution and the determined classification, wherein the determined packing scheme is configured to define a number of resolutions packed in a frame based, at least partially, on the determined classification; and performing packing of the immersive content in at least one frame based, at least partially, on the determined packing scheme.

12. An apparatus comprising:

at least one processor; and at least one memory storing instructions that, when executed with the at least one processor, cause the apparatus at least to:

determine, at least, a current viewport for viewing immersive content;

indicate the current viewport to a user equipment; and receive, from the user equipment, a bitstream comprising at least one packed frame of the immersive content, wherein at least one of a packing scheme of the at least one packed frame, or a resolution of at least a portion of the at least one packed frame is based, at least partially, on the indicated current viewport, wherein the packing scheme is configured to define a number of resolutions packed in a frame based, at least partially, on a classification of a head motion.

13. The apparatus of claim 12, wherein the instructions, when executed with the at least one processor, further cause the apparatus to:

receive an indication of a capability of the user equipment to perform a head motion dependent mixed resolution packing; and transmit an indication for the user equipment to perform the head motion dependent mixed resolution packing.

14. The apparatus of claim 12, wherein the instructions, when executed with the at least one processor, cause the apparatus to:

decode the received bitstream; and unpack the at least one packed frame.

15. The apparatus of claim 12, wherein the at least one packed frame comprises mixed resolution content.

16. The apparatus of claim 12, wherein the instructions, when executed with the at least one processor, cause the apparatus to:

receive an indication of the packing scheme of the at least one packed frame; and unpack the at least one packed frame based, at least partially, on the received indication.

17. The apparatus of claim 12, wherein the instructions, when executed with the at least one processor, cause the apparatus to:

receive an indication that the packing scheme of the at least one packed frame has changed; and unpack the at least one packed frame based, at least partially, on the received indication.

18. A method comprising:

determining, at least, a current viewport for viewing immersive content;

indicating the current viewport to a user equipment; and receiving, from the user equipment, a bitstream comprising at least one packed frame of the immersive content, wherein at least one of a packing scheme of the at least one packed frame, or a resolution of at least a portion of the at least one packed frame is based, at least partially, on the indicated current viewport, wherein the packing scheme is configured to define a number of resolutions packed in a frame based, at least partially, on a classification of a head motion.

* * * * *